United States Patent
Ryu (10) Patent No.: US 8,254,752 B2
(45) Date of Patent: Aug. 28, 2012

(54) METHOD AND SYSTEM FOR REPLAYING A MOVIE FROM A WANTED POINT BY SEARCHING SPECIFIC PERSON INCLUDED IN THE MOVIE

(75) Inventor: Jung-hee Ryu, Seoul (KR)

(73) Assignee: Olaworks, Inc., Seoul (KR)

( * ) Notice: Subject to any disclaimer, the term of this patent is extended or adjusted under 35 U.S.C. 154(b) by 870 days.

(21) Appl. No.: 12/285,728

(22) Filed: Oct. 14, 2008

(65) Prior Publication Data

US 2009/0116815 A1 May 7, 2009

(30) Foreign Application Priority Data

Oct. 18, 2007 (KR) .................. 10-2007-0105043

(51) Int. Cl.
  *H04N 9/80* (2006.01)
  *H04N 5/235* (2006.01)
  *H04N 5/775* (2006.01)
  *H04N 13/02* (2006.01)
  *G06K 9/00* (2006.01)
  *G06K 9/46* (2006.01)

(52) U.S. Cl. .......... 386/241; 386/230; 386/248; 348/47; 348/222.1; 382/118; 382/238

(58) Field of Classification Search .................. 386/241, 386/230, 248, E5.001, E5.07; 348/47, 222.1, 348/E5.053; 375/E5.053, E7.088, E7.089, 375/E7.129, E7.198, E7.199, E7.262, E7.279, 375/E7.281; 382/118, 238

See application file for complete search history.

(56) References Cited

U.S. PATENT DOCUMENTS

| | | | | |
|---|---|---|---|---|
| 2005/0008240 | A1* | 1/2005 | Banerji et al. | 382/238 |
| 2005/0259959 | A1* | 11/2005 | Nagao et al. | 386/69 |
| 2007/0112852 | A1* | 5/2007 | Sorvari et al. | 707/104.1 |
| 2008/0037838 | A1* | 2/2008 | Ianculescu et al. | 382/118 |

FOREIGN PATENT DOCUMENTS

| | | |
|---|---|---|
| KR | 2000-0009742 | 2/2000 |
| KR | 2004-0008791 | 1/2004 |
| KR | 2007-0017068 | 2/2007 |

* cited by examiner

*Primary Examiner* — Thai Tran
*Assistant Examiner* — Syed Hasan
(74) *Attorney, Agent, or Firm* — Husch Blackwell LLP (57) ABSTRACT

The present invention relates to a method for making a user easily replay a scene on which a specific person appears included in a movie. The method includes the steps of: (a) distinguishing persons appearing in the movie by recognizing their faces; (b) obtaining identifier of each distinguished person, feature data of the persons, information on time zone in which each person appears, wherein the information on the time zone includes a starting time and an ending time and wherein the ending time for a person is determined as the last time that the person appeared if the person has not appeared for more than a certain critical time; (c) displaying the identifier at a request of replay of the movie; and (d) replaying the movie from the starting time for a specific person who corresponds to a specific identifier if the specific identifier is selected.

17 Claims, 5 Drawing Sheets

FIG. 3

METHOD AND SYSTEM FOR REPLAYING A MOVIE FROM A WANTED POINT BY SEARCHING SPECIFIC PERSON INCLUDED IN THE MOVIE

FIELD OF THE INVENTION

The present invention relates to a method and a system for making a user more easily search and replay a scene on which a specific person appears included in at least one of movies or videos; and more particularly, to the user convenient method and system for helping to rapidly search the scene on which a specific person appears and replaying the movie from the scene by adopting face detection technology, face recognition technology and face tracking technology in order to increase the face recognition rates.

BACKGROUND OF THE INVENTION

Thanks to the wide spread of digital apparatuses exclusively for photography such as video cameras and digital video recorders as well as camera-imbedded mobile terminals and mp3 players, the number of users who create digital data such as videos recently has sharply increased.

Accordingly, the amount of digital data created has drastically increased as well and this has requested the necessity to build a system which can systematically manage and use enormous amount of data.

To perform the management of digital data and make users use such data more easily, various technologies granting tags to digital data through recognition of person have been suggested and a variety of methods which extract the tags from the digital data with higher accuracy have been attempted. Herein, "tag" may be understood as additional data attached to the digital data for rapid access or search to data and it is generally composed of a series of characters or numbers, or a combination of characters and numbers.

One example of technologies required to give a tag to digital data through person recognition is face detection technology. The face detection technology is widely adopted to enhance the image quality of a photo or a video created by means of digital device such as digital camera or video recorder, and it performs a function to adjust a focus point and a degree of exposure with a separate button by automatically recognizing a face or faces if one or multiple persons exist in the photographic range. For example, photography equipment with the face detection function competitively unveiled by Sony, Fujifilm, Nikon, Canon etc. can shot, edit and record photos or videos conveniently by using the above-mentioned function.

Despite the advantages, in case various videos regarding multiple events are randomly created in sequence by a video camera or a video recorder and a user wants to select and replay only a scene(s) on which a specific person appears in at least one of multiple movies or only a scene(s) on which only a specific person appears in one movie, there is, however, a disadvantage that the user must check the location of such scene(s) by fast-forwarding or rewinding function. The more detailed matters regarding the disadvantage are as follows:

First, according to the existing technology, there is a weak point that it is difficult to easily find and replay only the scene on which a specific person among multiple persons who appear in a movie regarding a certain event. For example, let us suppose that a user recorded his or her child's birthday party held during the time from 12:00 pm to 15:00 pm with a photography device and tries to replay it. Many people including family and friends as well as the child may appear on the birthday party video. It is not easy to search only the scenes on which his or her child appears (referred to as "people search"). To search a specific person, the user may need to operate the buttons such as PREV or NEXT of the DVD player or the buttons such as REW or FF of the video recorder, and check the time zone on which the specific person appears (for instance, the user would not know that the child appeared in the specific time zones from 12:00 to 12:20, from 12:45 to 13:05 and from 14:40 to 15:00 until the user pressed the buttons and checked all the scenes). Accordingly, it is very annoying and troublesome to view the scenes on which his or her child appears.

Second, it is difficult to see which persons appear in which time zones in a movie regarding which event on the whole. For example, it is difficult to search information on who appears in the birthday party movie, which persons appear in which time zone or in which time zone the user's child and the child's friends appear at the same time (referred to as "scene search").

SUMMARY OF THE INVENTION

It is an object of the present invention to select scenes on which a specific person appears in at least one movie regarding at least one event and replay the movie from the scenes on which the specific person appears.

It is another object of the present invention to provide user interface capable of making a user clearly comprehend which persons appear in at least one movie created regarding at least one of particular events by adopting technologies such as face detection technology, face recognition technology or face tracking technology to a movie during the record of the movie in real time or to an already created movie offline or online.

In accordance with one aspect of the present invention, there is provided a method for selectively replaying a movie from a scene on which a specific person appears, including the steps of: (a) distinguishing persons appearing in the movie by recognizing their faces through a face recognition technology; (b) obtaining identifier of each distinguished person, feature data of each face of the persons, information on time zone in which each person appears, wherein the information on the time zone includes a starting time and an ending time and wherein the ending time for a person is determined as the last time that the person appeared if the person has not appeared for more than a certain critical time; (c) displaying the identifier of each person at a request of replay of the movie; and (d) replaying the movie from the starting time for a specific person who corresponds to a specific identifier if the specific identifier is selected by a pointing device.

In accordance with another aspect of the present invention, there is provided a method for selectively replaying a movie from a scene on which a specific person appears, the movie including time-serially continuous multiple frames, including the steps of: (a) distinguishing persons appearing in the movie by recognizing their faces included in a specific frame through a face recognition technology; (b) obtaining identifier of each distinguished person, feature data of each face of the persons, information on time zone in which each person appears, wherein the feature data includes at least some features of the faces obtained by tracking the faces detected from the movie at periodical or non-periodical time interval, and the feature data is used to distinguish the persons included in frames following the specific frame, and wherein the information on the time zone includes a starting time and an ending time; (c) displaying the identifier of each person at a request of replay of the movie; and (d) replaying the movie from the starting time for a specific person who corresponds to a specific identifier if the specific identifier is selected by a pointing device.

In accordance with still another aspect of the present invention, there is provided a system for selectively replaying a movie from a scene on which a specific person appears, including: a person identifying part for distinguishing persons appearing in the movie by recognizing their faces through a face recognition technology and then obtaining identifier of each distinguished person, feature data of each face of the persons, information on time zone in which each person appears, wherein the information on the time zone includes a starting time and an ending time and wherein the ending time for a person is determined as the last time that the person appeared if the person has not appeared for more than a certain critical time; a person information database for recording the identifier, the feature data, the information on time zone therein; an interface part for displaying the identifier at a request of replay of the movie; and a control part for replaying the movie from the starting time for a specific person who corresponds to a specific identifier if the specific identifier is selected by a pointing device.

In accordance with still yet another aspect of the present invention, there is provided a system for selectively replaying a movie from a scene on which a specific person appears, the movie including time-serially continuous multiple frames, including: a person identifying part for distinguishing persons appearing in the movie by recognizing their faces included in a specific frame through a face recognition technology, and then obtaining identifier of each distinguished person, feature data of each face of the persons, information on time zone in which each person appears, wherein the feature data includes at least some features of the faces obtained by tracking the faces detected from the movie at periodical or non-periodical time interval, and the feature data is used to distinguish the persons included in frames following the specific frame, and wherein the information on the time zone includes a starting time and an ending time; a person information database for recording the identifier, the feature data, the information on time zone therein; an interface part for displaying the identifier at a request of replay of the movie; and a control part for replaying the movie from the starting time for a specific person who corresponds to a specific identifier if the specific identifier is selected by a pointing device.

In accordance with still yet another aspect of the present invention, there is provided one or more computer-readable media having stored thereon a computer program that, when executed by one or more processors, causes the one or more processors to perform acts including: distinguishing persons appearing in the movie by recognizing their faces through a face recognition technology; obtaining identifier of each distinguished person, feature data of each face of the persons, information on time zone in which each person appears, wherein the information on the time zone includes a starting time and an ending time and wherein the ending time for a person is determined as the last time that the person appeared if the person has not appeared for more than a certain critical time; displaying the identifier of each person at a request of replay of the movie; and replaying the movie from the starting time for a specific person who corresponds to a specific identifier if the specific identifier is selected by a pointing device.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
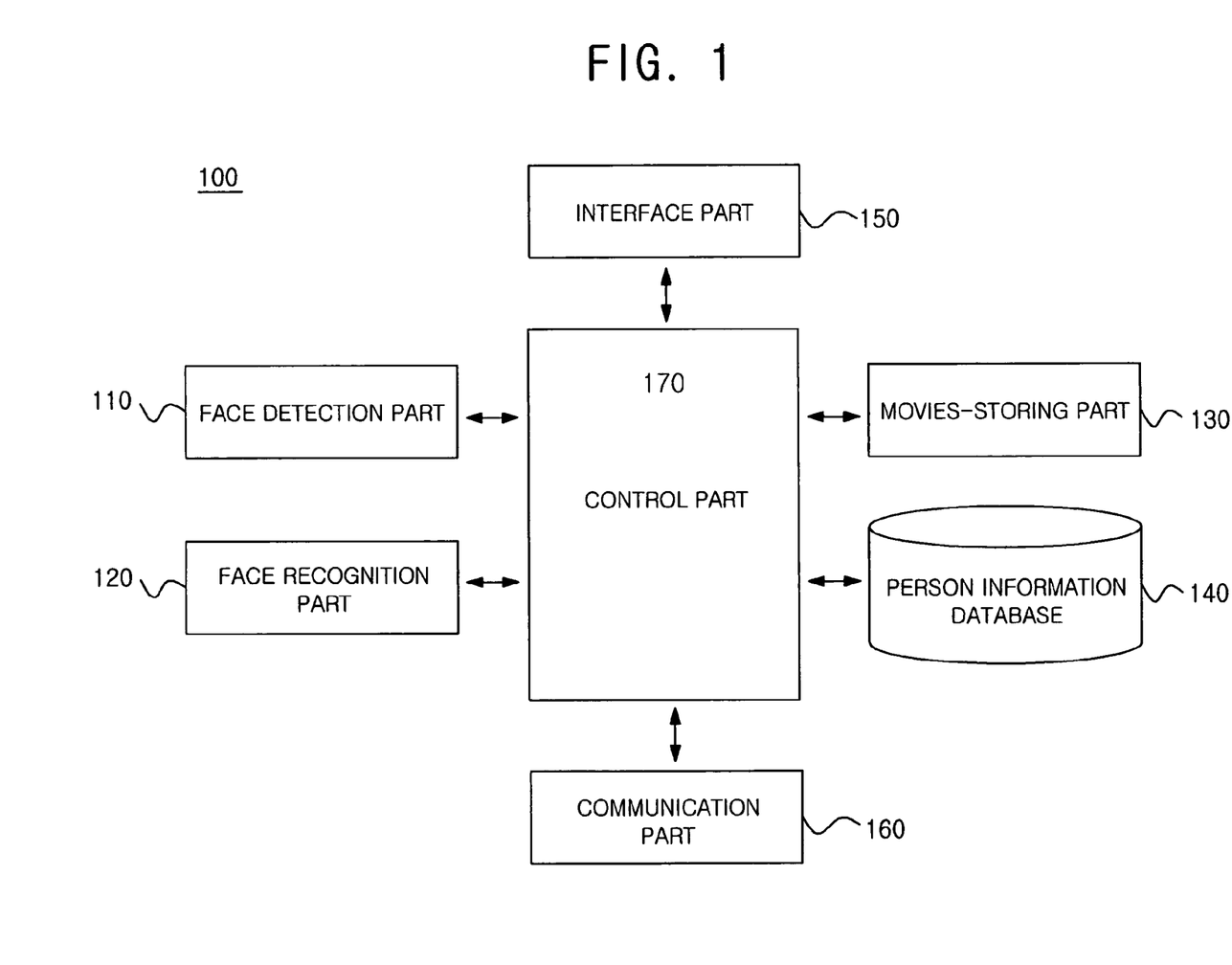
FIG. 1 is a configuration of the whole system 100 capable of helping to list the time zones when the whole or some persons appear in a movie and replay the movie from a wanted time by detecting and recognizing the faces of persons automatically and in real time during the creation of the movie by a video recorder etc. in accordance with an example embodiment of the present invention.

The configurations of the present invention for accomplishing the objects of the present invention are as follows:

FIG. 1 is a configuration of a system 100 for listing a time zone(s) at which whole or some persons appear in a movie and replaying the movie from a wanted time by detecting and recognizing the faces of persons automatically in accordance with an example embodiment of the present invention.

As illustrated in FIG. 1, the whole system 100 may include a face detection part 110, a face recognition part 120, a movies-storing part 130, a person information database 140, an interface part 150, a communication part 160, a control part 170 etc.

In accordance with one example embodiment of the present invention, at least some of the face detection part 110, the face recognition part 120, the movies-storing part 130, the person information database 140, the interface part 150, and the communication part 160 may be program modules included in a terminal such as video recorder, camcorder, cellular phone and the like, or program modules communicating with the terminal. In accordance with another example embodiment of the present invention, at least some of the face detection part 110, the face recognition part 120, the movies-storing part 130, the person information database 140, the interface part 150, and the communication part 160 may be program modules included in a server or program modules communicating with the server. In accordance with still another example embodiment of the present invention, at least part of the face detection part 110, the face recognition part 120, the movies-storing part 130, the person information database 140, the interface part 150, and the communication part 160 may be program modules included in the terminal and the other part thereof may be program modules included in the server. Such program modules may be included in a form of an operating system, an application program module and other program modules, or they may be stored either in various storage devices well known to those skilled in the art or in a remote storage device capable of communicating with the terminal or the server. The program modules may include but not be subject to a routine, a subroutine, a program, an object, a component, and a data structure for executing a specific operation or a type of specific abstract data that will be described in accordance with the present invention.

The face detection part 110 and the face recognition part 120 to be explained below are classified for convenience's sake to perform the function of face detection and recognition and it is not limited to this case.

The face detection part 110 may detect face regions of persons shot in real time on a movie which is being created by a video recorder etc. or the face regions of the persons appearing on the already created movie. If a face region of a specific person is detected during the creation, replay or other various processes of the movie, the face detection part 110 may frequently detect the face region of the specific person while regularly or irregularly tracking (or chasing) the detected face region. In this regard, it is explained below by referring to FIG. 2.

Figure 2:
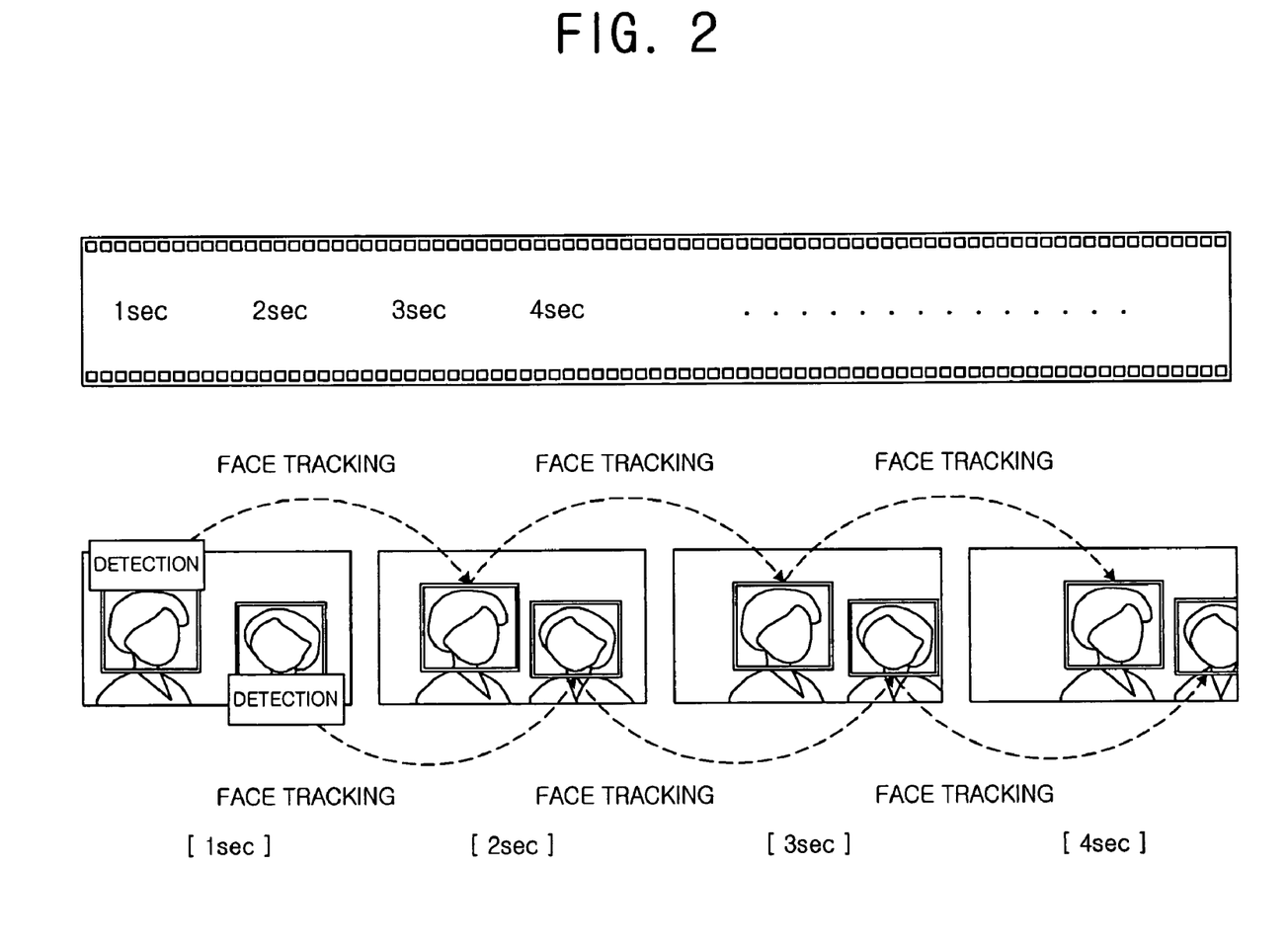
FIG. 2 is a drawing illustrating how to increase face recognition rate by using face detection and face tracking technologies.

FIG. 2 is a drawing illustrating how to increase face recognition rate by using face detection and face tracking technologies.

By reference to FIG. 2, if the faces of the persons are detected, it is possible to regularly or irregularly redetect the faces while the face tracking process is performed. With the use of such detection and tracking technology, it is possible to increase the face recognition rate regardless of a variety of expressions and angles of the faces.

The face recognition part 120 performs the function of proving the identities of the persons detected by the face detection part 110 by adopting face recognition technology.

As face detection and recognition technologies, methods may be introduced such as principal component analysis and linear discriminant analysis and relevant methods mentioned in "Face Recognition: A Literature Survey," an article written by Zhao, R. Chellappa, A. Rosenfeld and P. J. Phillips published in ACM Computing Surveys in 2003 or "Analysis of PCA-based and Fisher Discriminant-Based Image Recognition Algorithms," an article authored by W. S. Yambor and published in Technical Report by University of Colorado Department of Computer Science in 2000 may be considered as an example.

In detail, it is possible to increase the face recognition rate by performing face matching technology by comparing the features (such as eyes, nose, mouth and contour of the face) of a person with those of the persons which already have been recorded in the person information database 140.

"Lucas-Kanade 20 Years On: A Unifying Framework," an article authored by Baker, S. and one other and published as an article in International Journal of Computer Vision (IJCV) in 2004 mentions as example the technology related to face matching by reference to the features of the faces Baker, S. The article describes how to effectively detect the location of eyes from the image including the face of a person by using a template matching method.

The face detection part 110 and/or the face recognition part 120 may presume the locations of nose and mouth based on the location of the eyes detected by the above-mentioned technology and they may increase the face recognition rate by comparing the images regarding eyes, nose, mouth etc. included in the person information database 140 with the extracted eyes, nose, mouth etc.

Herein, the method of searching each part such as eyes, nose and mouth may be performed by using the technology such as the linear discriminant analysis disclosed in "Eigenfaces vs. Fisherfaces: Recognition Using Class Specific Linear Projection" written by P. N. Belhumeur and two others and published in IEEE TRANSACTIONS ON PATTERN ANALYSIS AND MACHINE INTELLIGENCE in 1997.

It may be possible to get the similarity of the whole face by using the weighted sum etc. acquired from the similarity of each part of the face by using the above-mentioned method. The weight for each part may be determined based on the significance in human perception.

The movies-storing part 130 may be implemented by a recordable medium in which the movies created by a video recorder etc. or received from a server or a terminal are recorded. In the meantime, a movie streaming etc. may not be recorded in the movies-storing part 130, but it is sure that there is no problem to apply the processes of the present invention to be explained below to this case.

The person information database 140 records the information on the thumbnails of persons appearing in the movies recorded in the movies-storing part 130 (or other movies which are not recorded in the movies-storing part 130), the feature data of each person and time zone on which the persons appear (in short, cluster information).

The thumbnails of the persons appearing in the movies may be determined with images at the time when each person first appears in one of movies or with those at the time when a person reappears after long disappearance even in the same movie. Of course, they are not limited to these cases. Furthermore, the feature data may include the information on the features of the eyes, nose and mouth of each face as mentioned above and the cluster information may include time zone information on which each person continuously appears—i.e. starting time and ending time. It is sure that the term of "continuously appear" does not mean that such a person must appear on the screen continuously during that time zone but it may mean that such a person can disappear during a specific time span shorter than a predetermined critical time.

The person information database 140 may be filled while persons are detected and recognized from a plurality of scenes included in a movie either in real time during the creation of the movie or in the already created movie in non-real time.

For example, during the creation or the replay of a movie or other processes similar to replay thereof, if a specific face recognized by the face recognition part 120 is judged as the person appearing first in the movie, the thumbnail of the specific person acquired from the scene at the time when he or she first appears in the movie may be recorded in real time or non-real time in the person information database 140 and even if the specific person reappears in the same movie after non-appearance longer than the predetermined critical time, the thumbnail of the specific person acquired from the scene at the time when he or she reappears in the movie may be recorded in the person information database 140.

In addition, the feature data which may be obtained from a variety of angles and expressions of the face of a person who first appears on the screen or who already has appeared may be recorded in the person information database 140 and even cluster information, i.e., time zone, on which the person continuously appears may also be recorded in the person information database 140. Herein, the cluster information must include the information on the starting time and the ending time as mentioned above. Because the ending time cannot be found while the specific person continuously appears, in case it is perceived that the specific person does not appear for a longer time than the predetermined critical time in real time, a time when the person lastly appears may be determined as the ending time and then recorded in the person information database 140. This will be described below by reference to FIG. 3.

The person information database 140 includes a narrow meaning of database as well as a wide meaning of database containing the data record based on the file system. Further, even a set of simple logs from which the data might be retrieved and extracted may be included in the above-mentioned database. The person information database 140 may be included in the system 100 but may exist in a remote memory device communicable to the system 100.

The interface part 150 displays the cluster information and the thumbnails of the persons recognized by the face detection part 110 and the face recognition part 120. Accordingly, if a specific thumbnail of the specific person is selected by the user, the user can easily view the movie from the scene the specific thumbnail is acquired.

The communication part 160 plays a role in receiving and transmitting signals among component modules in the system 100 or data among a variety of external devices.

In accordance with the present invention, the control part 170 performs a function to control the flow of data among the face detection part 110, the face recognition part 120, the movies-storing part 130, the person information database 140, the interface part 150 and the communication part 160. In other words, the control part 170 controls the signals received and transmitted among the component modules through the communication part 160 to thereby make the face detection part 110, the face recognition part 120, the movies-storing part 130, the person information database 140 and the interface part 150 perform their unique functions.

Figure 3:
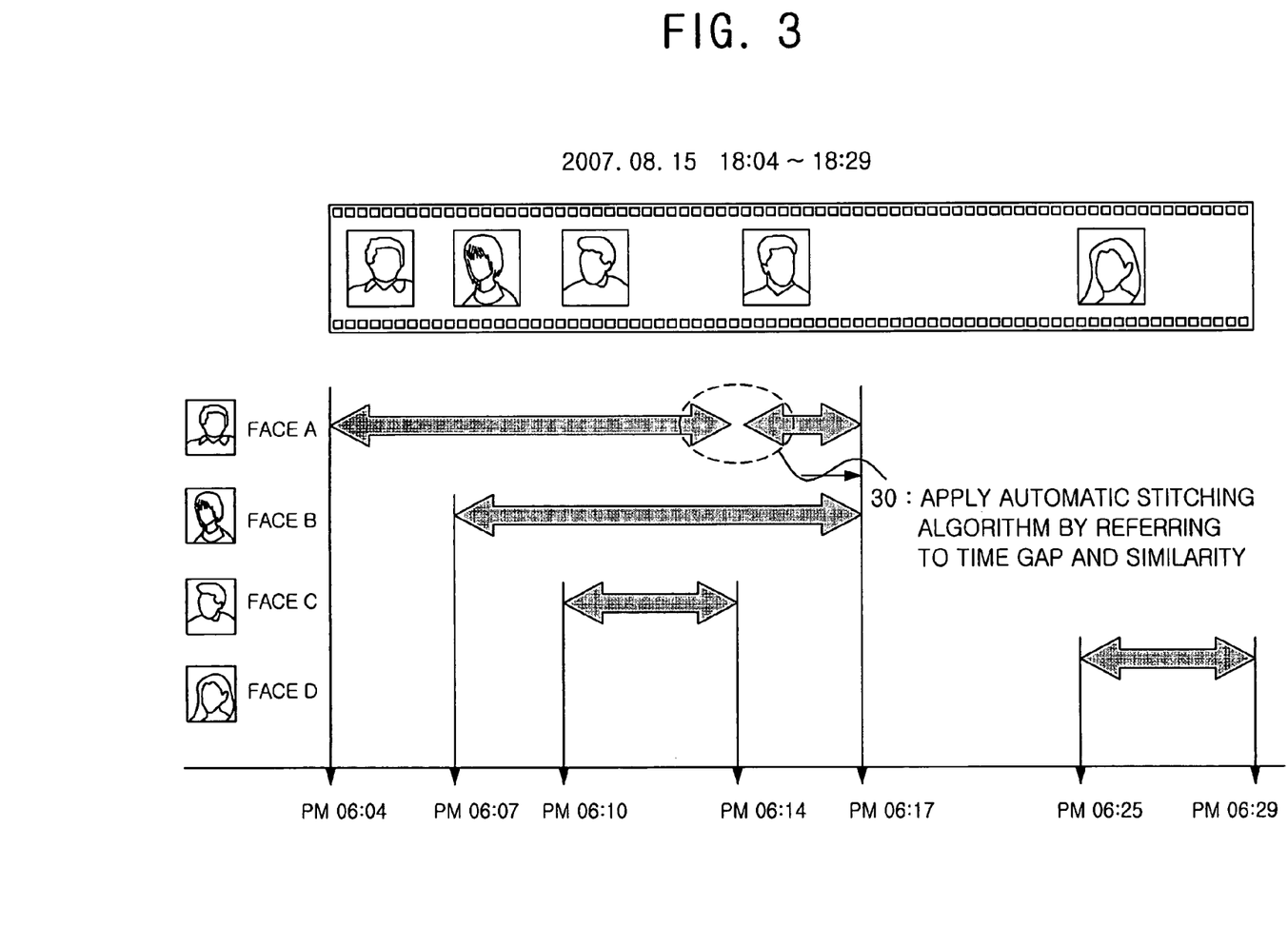
FIG. 3 is a drawing which illustrates an example of clipping the information on thumbnails, feature data and clusters of persons appearing on the movie during the creation of the movie in accordance with the present invention.

FIG. 3 is a drawing which illustrates an example of clipping the information on the thumbnails, the feature data and the clusters of persons appearing on the movie in accordance with the present invention.

The term of "clipping" may mean the total of technology which records and manages the thumbnail images, the feature data and the cluster information of each person appearing in a movie in the person information database 140 by using face detection and recognition technology etc.

By reference to FIG. 3, the movie is created during the time from 18:04 to 18:29 on Aug. 15, 2007 and recorded in the movies-storing part 130. Furthermore, the thumbnail images, the feature data and the cluster information of each person appearing in the movie are recorded in the person information database 140 as mentioned above.

Let us assume that a person called "A" appears in the movie during the time from 18:04 to 18:17. In this case, it is possible to recognize a person appearing on the screen at the time of 18:04 during the creation of the movie as "A" by using a variety of face recognition technologies. Moreover, since "A" first appears at 18:04 in the movie, a thumbnail is acquired from the image of "A" at 18:04 and then recorded in the person information database 140. Furthermore, the information on a specific time span (that is, duration between the starting time and the ending time, i.e. 18:04 and 18:17) at which "A" continuously appears is recorded in the person information database 140.

Herein, whether the person called "A" continuously appears or not is found based on the face recognition technology, in which the concept of "continuously appear" is defined as mentioned above. In detail, by referring to a reference number 30 of FIG. 3, the figure describes the concept of time gap during which the person "A" does not appear. If the time gap exceeds a predetermined critical time, it may be considered as duration that the person "A" does not continuously appear.

As shown in FIG. 3, the person "A" stops appearing around at 18:14 and then reappears a few minutes later, i.e., at 18:17. Whether this time gap is ignored or not is dependent on the criterion as follows: If the time gap does not exceed the predetermined critical time, duration from 18:04 to 18:17 may be considered as one cluster for the person "A" without separating clusters by using an automatic stitching algorithm etc. Surely, if the time gap exceeds the predetermined critical time, they may be considered as separate clusters and the starting time and the ending time of each cluster may be recorded in the person information database 140. As such, it is sure that the same task may be carried out to other persons such as "B", "C" and "D".

"A Stitching Algorithm of Still Pictures with Camera Translation," an article jointly authored by Yang Linhong and Masaahito Hirakawa would be referred to as an example of the existing technology related to the automatic stitching algorithm. However, it is sure that the example of the automatic stitching algorithm is not limited to this article and various examples may be adopted.

Even though FIG. 3 illustrates only the cluster information of persons "A", "B", "C" and "D" who appear in a movie shot during the time from 18:04 to 18:29, if separate movies have been created regarding another events before or after the movie, the information on thumbnails, feature data and clusters regarding persons "A", "B", "C" and "D" and/or other persons, e.g., persons "E", "F" and "G", appearing in other events may be recorded in the person information database 140. Of course, the information on the thumbnails, the feature data and the clusters may be read from the person information database 140 and displayed on the screen at the request of the user.

Figure 4:
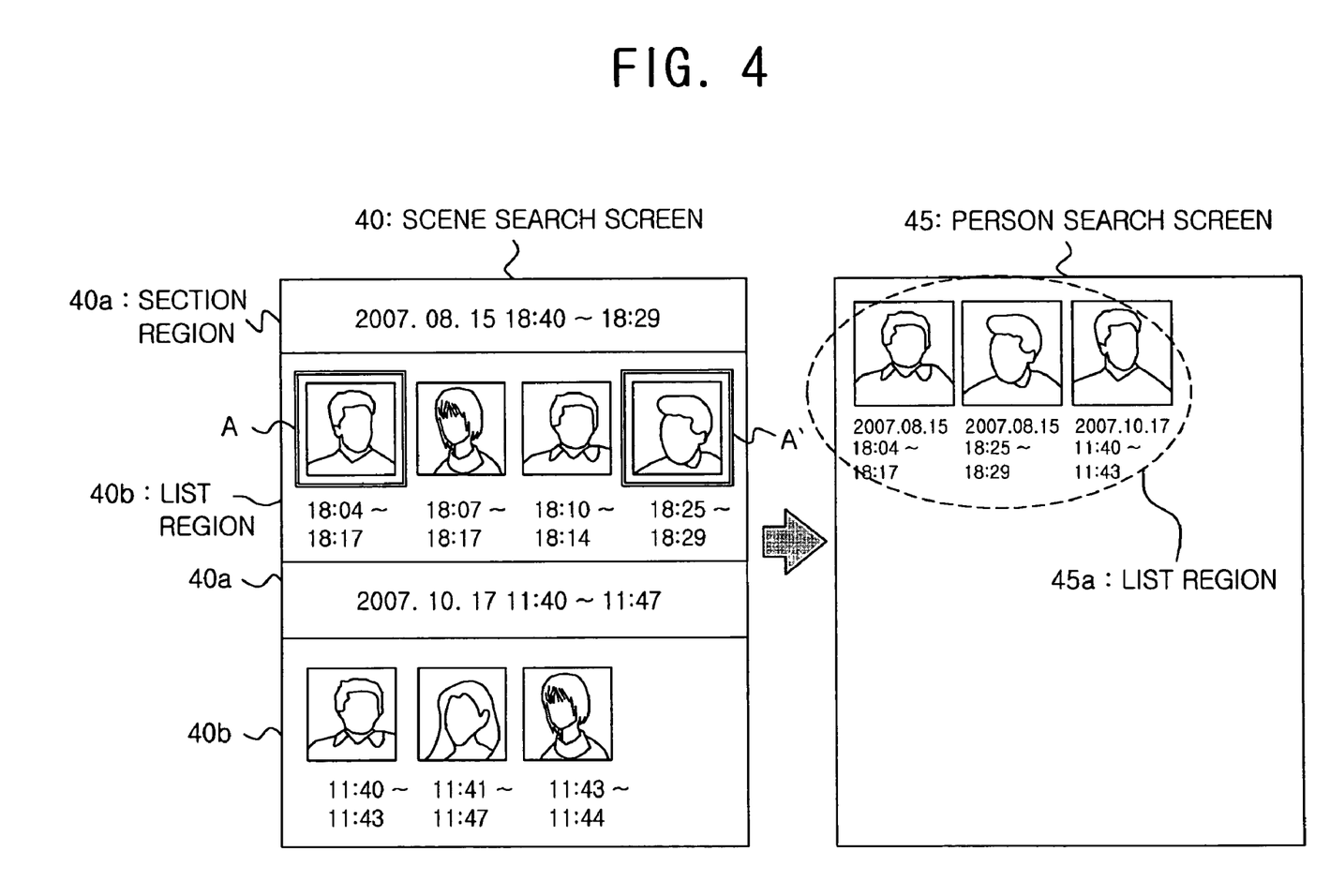
FIG. 4 is a drawing illustrating an example of scene search and person search by using the system 100 in accordance with the present invention.

FIG. 4 illustrates an example of the scene search and the person search by using the system 100 in accordance with the present invention.

As shown in FIG. 4, a scene search screen 40 and a person search screen 45 are exemplarily displayed on the screen.

More specifically, the scene search screen 40 may include a section region 40A and a list region 40B, and the person search screen 45 may include a list region 45A.

Herein, the section region 40A may be more than one as shown in FIG. 4, but in other case it may be one. If the section region 40A is more than one, this means that there are at least two movies shot at different places or different times and if the section region 40A is only one, this may mean that only one movie is shot.

Looking at the section region 40A in FIG. 4, it may be seen that the first movie shot at the time span from 18:04 to 18:29 on Aug. 15, 2007 and the second movie shot at the time span from 11:40 to 11:47 on Aug. 17, 2007 are recorded in the movies-storing part 130.

In addition, the list region 40B may exist in each section region 40A regarding each movie and the list region 40B displays the thumbnails of the persons appearing in the movie and/or the information on time zone in which the persons appear. As such, the information displayed in the list region 40B may be obtained through real time or non-real time processes as mentioned above.

If a thumbnail (of person "A") on the left edge of the first movie among the thumbnails of the persons listed in the list region 40B of the scene search screen 40 is selected, as shown in the person search screen 45 of FIG. 4, thumbnails of face images which have the highest top n similarity to the face of person "A" among the images of the faces appearing at least in one of all recorded movies (i.e., the first and second movies) may be displayed in order of similarity. As such, the thumbnails may be obtained through the processes as mentioned above. Of course, if the face recognition rate is considerably high, the thumbnails displayed on the person search screen 45 would be all the images of "A". In other words, each thumbnail corresponding to each cluster of "A" would be displayed.

In short, if the thumbnail of a person the user wants to see is selected among multiple persons displayed in the list region 40B of the scene search screen 40, information on one or more time zones when the selected person appears in the multiple movies will be obtained and the cluster information and/or the corresponding thumbnail(s) may be displayed in the list region 45A of the person search screen 45. Herein, in case the thumbnail(s) and/or the cluster information of the selected person are displayed in the list region 45A of the person search screen 45, it is sure that there are various examples of displaying the thumbnail(s) and/or the cluster information.

The person included in the leftmost thumbnail of the list region 40B of the first movie of the scene search screen 40 (person "A") and the person included in the rightmost thumbnail of the list region 40B of the first movie (person "A'") may be the same person and this will correspond to the case in which the same person has two clusters in one movie.

As another variable example, if the same person has multiple clusters in one movie, only the thumbnail corresponding to the preceding cluster may be displayed in the list region 40B and then if the displayed thumbnail is selected, it is also possible to display all multiple clusters of the person in the list region 45A of the person search screen 45.

By reference to the person search screen 45 of FIG. 4, the person "A" appears at the time zones from 18:04 to 18:17 and from 18:25 to 18:29 in the first movie shot on Aug. 15, 2007 and also at the time zone from 11:40 to 11:43 in the second movie shot on Oct. 17, 2007. It is sure that if one of the three clusters regarding the person "A" is selected, it is possible to replay from the corresponding part.

Figure 5:
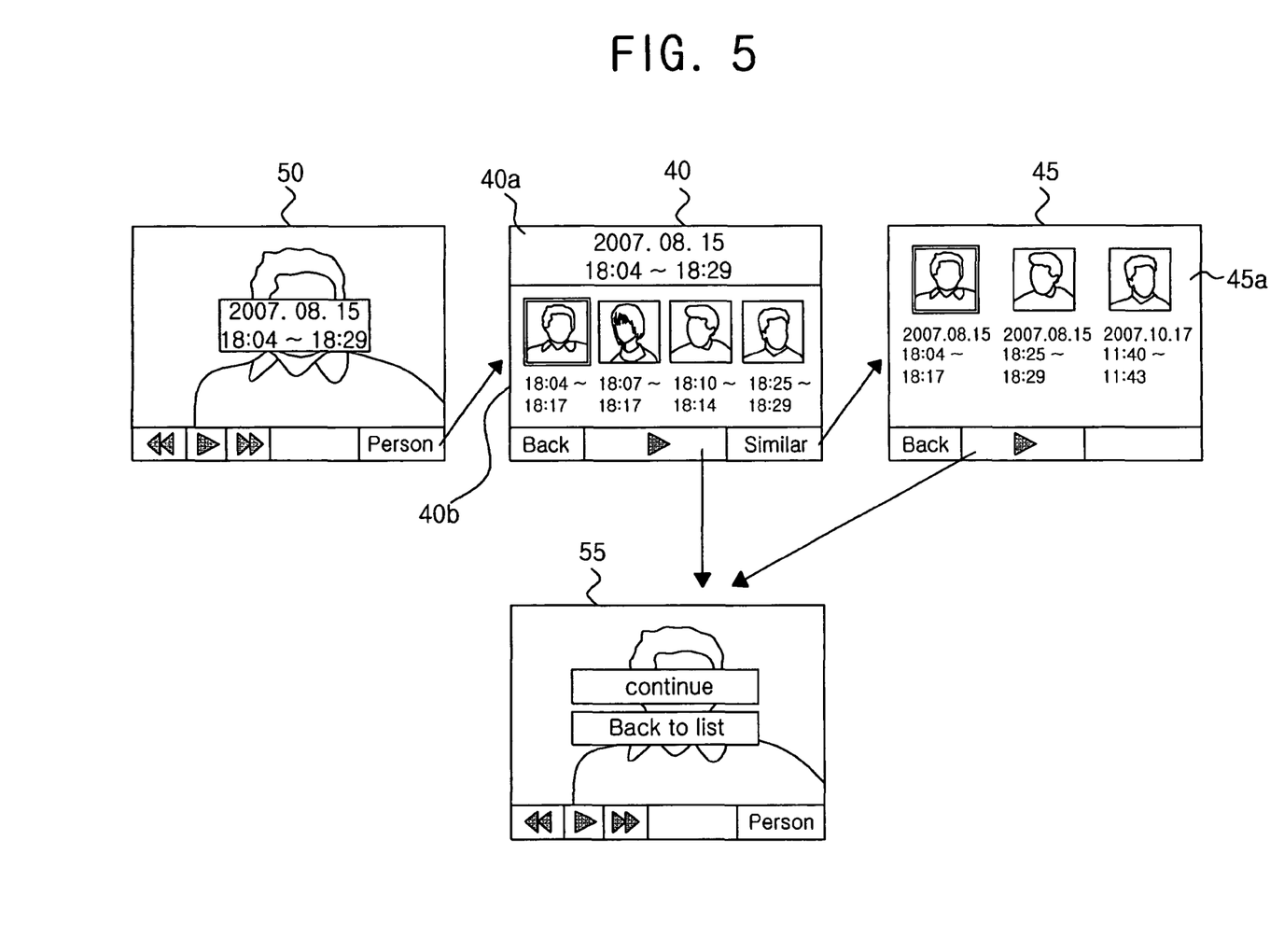
FIG. 5 is an illustration of user interface for providing the functions of the scene search and the person search by using the system 100 in accordance with the present invention.

By reference to FIG. 5, a normal replay screen 50 through a video recorder etc. is illustrated. Such a screen 50 may be a still screen before the replay, a screen during the replay or a screen suspended during the replay. On the right bottom of the screen 50 is a button written "Person," and if the button is selected, the scene search screen 40 of the movie is displayed as illustrated in FIG. 4. By reference, FIG. 5 shows the case in which only one section region 40A of the scene search screen 40 exists. On the bottom of the scene search screen 40 are a "Back" button which may be back to the screen 50, a "Similar" button which may boot the person search screen 45 as illustrated in FIG. 4 and a replay button which may replay clusters corresponding to particular thumbnails between the "Back" button and the "Similar" button. The replay button exists even on the bottom of the person search screen 45 and if the replay button is selected, the screen 55 is provided. The screen 55 has a "Continue" button which may replay the cluster corresponding to the selected thumbnail and a "Back to list" button which may be back to the scene search screen 40 or the person search screen 45. Of course, the example of such a user interface is not limited to this case and may include various examples.

The present invention is applied not only to the case of processing video data in real time as shown above but also to the case of processing them in non-real time. The terms on the real time and the non-real time process may be specifically defined as follows:

In other words, if the processing speed of one frame regarding the specific video data is equal to, or shorter than, the frame interval of the specific video data, it may be defined as the real time process, and if the processing speed is longer than the frame interval of the specific video data, it may be referred to as the non-real time process.

For example, if the process time for one frame is one fifth of a second and the input video has 5 frames/sec, it may be seen as the real time indexing but if the process time for one frame is one fifth of a second and the input video has 30 frames/sec, it may be regarded as the non-real time indexing.

The non-real time indexing method may have the cases performed online and offline. First, if it is performed online, it is a case in which the information on the currently processing frame and previous frames is known, but it will correspond to the case in which the processing speed of one frame is longer than the frame interval of the video data under the situation which data would be inputted in the future is unknown. Furthermore, if it is performed offline, the whole video data would be already known unlike the case online. Even if the video data is processed in the non-real time, it would be possible to achieve the effect that the movie can be easily replayed from a specific scene among a plurality of scenes when each person first appears in each movie by listing and displaying the thumbnails of the persons appearing in the movies and the time zone at which the persons appear.

Of course, the present invention may display the thumbnail of each person on the screen as illustrated in FIGS. 4 and 5, but in other case, the present invention also display a variety of identifiers of each person such as a name, an ID, a phone number and an email.

For the reason that the scene search mode provides the interface which lists and displays the persons appearing in each movie and the time zone (or time cluster) at which they appear in the movie, the present invention has an effect to easily replay the movie from the point of time at which each person first appears in each movie by referring to the list of persons by movie.

Furthermore, for the reason that the person search mode provides the interface which lists and displays identifiers such as thumbnail regarding a specific person included in at lest one movie and at least one time zone on which a specific person appears, the present invention brings an effect to select and replay only the scenes on which the specific person appears that the user is much interested in.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for selectively replaying a movie from a scene on which a specific person appears, the movie including time-serially continuous multiple frames, comprising the steps of:
   (a) distinguishing persons appearing in the movie by recognizing their faces included in a specific frame through a face recognition technology;
   (b) obtaining identifier of each distinguished person, feature data of each face of the persons, information on time zone in which each person appears, wherein the feature data includes at least some features of the faces obtained by tracking the faces detected from the movie at periodical or non-periodical time interval, and the feature data is used to distinguish the persons included in frames following the specific frame, and wherein the information on the time zone includes a starting time and an ending time;
   (c) displaying the identifier of each person at a request of replay of the movie; and
   (d) replaying the movie from the starting time for a specific person who corresponds to a specific identifier if the specific identifier is selected by a pointing device,
   wherein, if there is a time gap in which the person does not continuously appear for less than a specific critical time, the step (b) includes the step of ignoring the time gap by automatic stitching algorithm.

2. The method of claim 1, wherein the identifier includes at least one thumbnail for each person.

3. The method of claim 2, wherein the step (c) includes the step of displaying the thumbnail and the information on the time zone at the same time.

4. The method of claim 3, wherein the step (b) includes the step of setting the thumbnail of the person as still image of the person at the starting time.

5. The method of claim 1, wherein the step (c) includes the step of displaying a section area including information for distinguishing the movie from others, thumbnails and information on time zones of persons appearing in the movie.

6. The method of claim 5, wherein the step (d) includes the steps of:
   (d1) displaying information on all the time zones in which a specific person corresponding to a specific thumbnail appears, if the specific thumbnail is selected by the pointing device; and
   (d2) replaying the movie from the starting time included in the information on a specific time zone if the specific time zone is selected by the pointing device.

7. The method of claim 6, wherein, if a specific thumbnail is selected by the pointing device, the step (d1) includes the step of creating thumbnails by using still images at the starting times included in the information on all the time zones in which the specific person corresponding to the specific thumbnail appears and then displaying the created thumbnails and all the time zones.

8. The method of claim 7, wherein the step (d1) includes the step of displaying the thumbnails in the order of the similarity between the faces of persons included in the thumbnails and the face of the specific person.

9. The method of claim 8, wherein the step (d1) includes the step of deciding the order of the similarity by comparing the feature data regarding the specific person with those of the thumbnails.

10. The method of claim 1, wherein the steps (a) and (b) are performed in the terminal.

11. The method of claim 1, wherein the steps (a) and (b) are performed in the server.

12. The method of claim 1, wherein the movie has been already created.

13. A system for selectively replaying a movie from a scene on which a specific person appears, the movie including time-serially continuous multiple frames, comprising:
   a person identifying part for distinguishing persons appearing in the movie by recognizing their faces included in a specific frame through a face recognition technology, and then obtaining identifier of each distinguished person, feature data of each face of the persons, information on time zone in which each person appears, wherein the feature data includes at least some features of the faces obtained by tracking the faces detected from the movie at periodical or non-periodical time interval, and the feature data is used to distinguish the persons included in frames following the specific frame, and wherein the information on the time zone includes a starting time and an ending time;
   a person information database for recording the identifier, the feature data, the information on time zone therein;
   an interface part for displaying the identifier at a request of replay of the movie; and
   a control part for replaying the movie from the starting time for a specific person who corresponds to a specific identifier if the specific identifier is selected by a pointing device,
   wherein, if there is a time gap in which the person does not continuously appear for less than a specific critical time, the person identifying part ignores the time gap by automatic stitching algorithm.

14. The system of claim 13, wherein the person identifying part obtains the thumbnail of the person from still image of the person at the starting time.

15. The system of claim 13, wherein the interface part displays the thumbnail and the information on time zone of the person at the same time on a screen of the movie recorder.

16. The system of claim 13, wherein the identifier includes at least one of a name, an ID, a phone number and an email address of the person.

17. The system of claim 13, wherein the movie has already been created.

* * * * *